(12) United States Patent
Rivers

(10) Patent No.: US 6,860,622 B1
(45) Date of Patent: Mar. 1, 2005

(54) ILLUMINATION APPARATUS FOR USE IN ASSOCIATION WITH UTILITY STRUCTURES

(75) Inventor: Paul Brent Rivers, Cullman, AL (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 0 days.

(21) Appl. No.: 10/634,034

(22) Filed: Aug. 4, 2003

(51) Int. Cl.[7] .............................................. F21V 21/00
(52) U.S. Cl. ..................... 362/391; 362/407; 362/436; 362/191
(58) Field of Search ................................. 362/368, 376, 362/384, 391, 389, 396, 407, 418, 430, 436, 457, 458, 190, 191

(56) References Cited

U.S. PATENT DOCUMENTS

| | | | | |
|---|---|---|---|---|
| 5,163,752 A | * | 11/1992 | Copeland et al. | 362/396 |
| 5,209,562 A | * | 5/1993 | Glassford | 362/378 |
| 5,448,463 A | * | 9/1995 | Leen | 362/396 |
| 5,510,970 A | * | 4/1996 | Hollenbach et al. | 362/396 |
| 5,515,246 A | * | 5/1996 | Maglica | 362/473 |
| 5,702,175 A | * | 12/1997 | Chen | 362/191 |
| 5,765,793 A | * | 6/1998 | Yu | 248/126 |
| 5,797,670 A | * | 8/1998 | Snoke et al. | 362/119 |
| 5,823,657 A | * | 10/1998 | Price et al. | 362/191 |
| 5,823,658 A | * | 10/1998 | Doddy | 362/191 |
| 6,062,703 A | * | 5/2000 | Tsao | 362/184 |
| 6,428,192 B1 | * | 8/2002 | Chen | 362/474 |
| 6,585,400 B2 | * | 7/2003 | Leen | 362/418 |
| 6,712,485 B2 | * | 3/2004 | Matthews | 362/191 |
| 2003/0202345 A1 | * | 10/2003 | Kim | 362/190 |

FOREIGN PATENT DOCUMENTS

DE 3321426 A1 * 12/1984

* cited by examiner

Primary Examiner—Thomas M. Sember
Assistant Examiner—Hargobind S. Sawhney

(57) ABSTRACT

In one embodiment, an illumination apparatus structured for use in association with a utility structure is provided. The illumination apparatus includes a main housing having a light source operatively associated with the main housing; and, at least one pedestal assembly detachably connected to the main housing, at least one of the pedestal assemblies having at least one set of jaws structured for receiving a portion of a cable therein.

16 Claims, 4 Drawing Sheets

ILLUMINATION APPARATUS FOR USE IN ASSOCIATION WITH UTILITY STRUCTURES

BACKGROUND

Many work environments suffer from a lack of readily available and conveniently accessible illumination sources that can be employed to illuminate structures or obstructions located in the proximity of a work area, to illuminate tools employed during work performed at the work area, and/or to illuminate the particular equipment at the work area on which work is to be performed.

In various utility related industries, for example, work environments may involve scaling elevated structures, entering confined spaces and/or accessing other inconvenient work sites to perform maintenance and other functions on utility equipment installed and maintained at the work sites. In such environments, it can be difficult for a worker to manipulate work tools, to perform work on equipment at the work area, and also to maintain a reasonably stable physical position such as may be of concern on a utility pole, for example, or another elevated structure associated with the work site. In addition, if the work is performed under adverse weather conditions, for example, or at night, or if the work requires fine motor skills and enhanced concentration (i.e., as may be needed for working with relatively small equipment components, for example), the worker may also need to consider the presence and availability of adequate illumination at the work site. Conventional illumination devices, such as those typically used in association with elevated structures, confined spaces, and other difficult-to-access work sites, may need frequent manual attention and manipulation to provide sufficient and effective illumination during work performance.

What are needed, therefore, are improved apparatuses for illuminating work areas associated with elevated, confined or otherwise difficult-to-access work sites. Such improved illumination apparatuses are needed to minimize the burden on workers at the work site with respect to carrying, manipulating and/or adjusting light sources to illuminate a work area.

SUMMARY

In one embodiment of the present embodiments, an illumination apparatus structured for use in association with a utility structure is provided. The illumination apparatus includes a main housing having a light source operatively associated with the main housing; and, at least one pedestal assembly detachably connected to the main housing, at least one of the pedestal assemblies having at least one set of jaws structured for receiving a portion of a cable therein.

In another embodiment, an illumination apparatus structured for use in association with a utility structure is provided. The illumination apparatus includes a main housing; a handle having at least one arm operatively associated with the main housing; at least one pedestal assembly having at least one set of jaws, the pedestal assembly having a portion connected to the main housing, the set of jaws being structured for receiving a portion of a cable therein; and, at least one push rod connected to a portion of at least one of the sets of jaws, the push rod being structured for contact with the arm of the handle.

In another embodiment, an illumination apparatus structured for use in association with a utility structure is provided. The illumination apparatus includes a main housing having a light source operatively associated with the main housing; at least one pedestal assembly detachably connected to the main housing, at least one of the pedestal assemblies having at least one set of jaws structured for receiving a portion of a cable therein, at least one of the sets of jaws being resiliently biased in a normally closed positioned; and, at least one lining positioned on at least a portion of at least one of the sets of jaws.

DESCRIPTION

As used herein, the term "utility structure" includes, for example and without limitation, telephone poles and other structures supporting utility related equipment and services, such as electricity service and television service; scaffolding; radio towers; oil rigs; construction sites for buildings and other erections; structures that require elevation of a worker; and any other structures suitable for use in association with the various apparatus embodiments discussed herein.

As used herein, the term "cable" can include, for example and without limitation, telephone lines, cable lines, power lines, and/or other utility lines; high tension wires, support lines; structural members such as I-beams, rods, pipes, bars; and, any other generally horizontal wire or structural member suitable for application to the different aspects of the various apparatus embodiments discussed herein.

Figure 1:
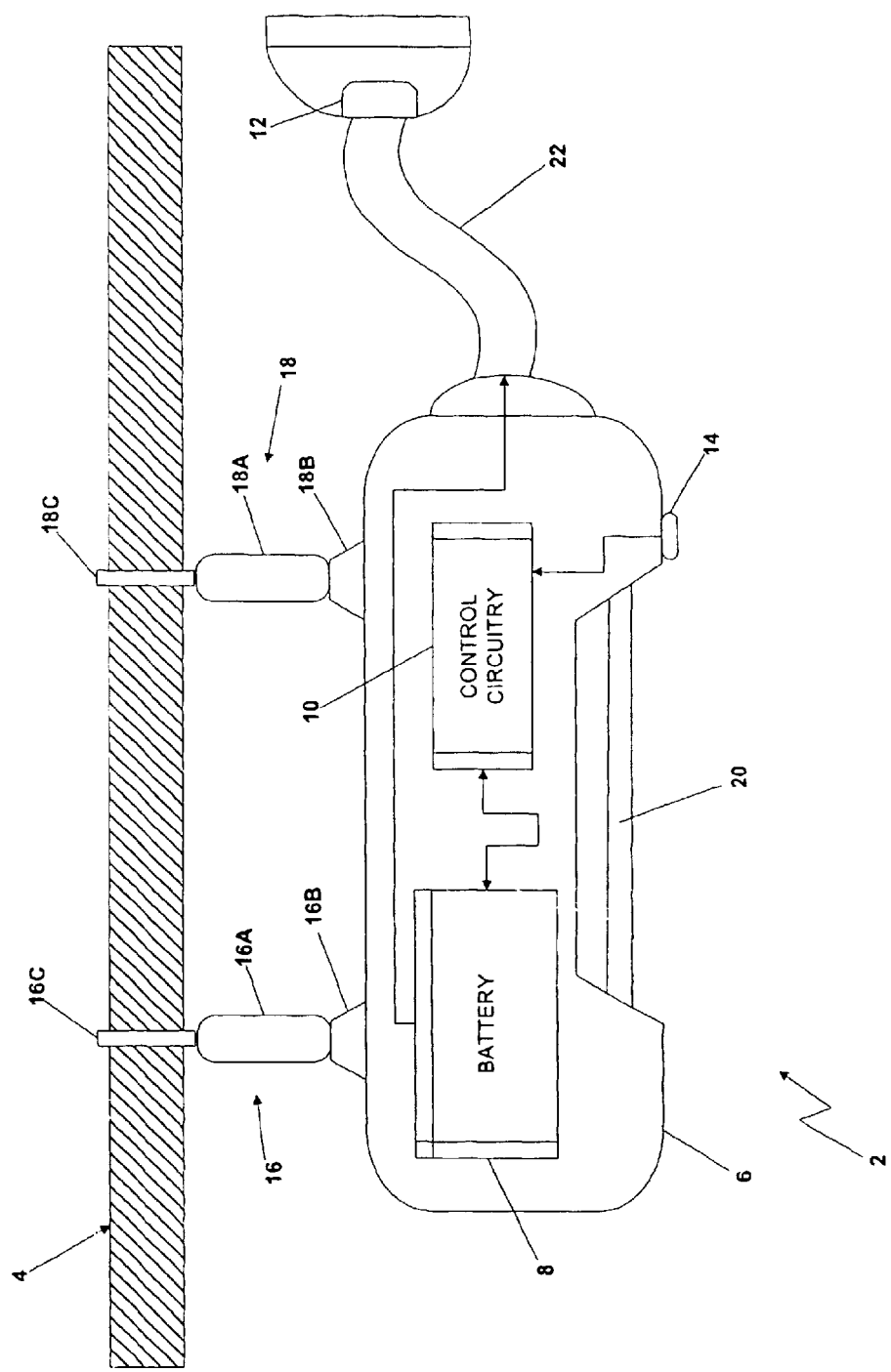
FIG. 1 includes a schematic side view illustration of one example embodiment of an illumination apparatus provided in accordance with the present illumination apparatus embodiments, including schematic diagrams of various internal components of the illumination apparatus.

Referring now to FIG. 1, in one illustrative example embodiment of an illumination apparatus, an illumination apparatus 2 is installed in operative association with a cable 4. In this example embodiment, the cable 4 can be connected between utility structures such as between/among two or more telephone poles, for example. In one aspect, the illumination apparatus 2 includes a main housing 6 having at least one power source such as a battery 8, for example, housed in the main housing 6. The battery 8 is operatively connected to conventional control circuitry 10, which control circuitry 10 is configured to complete an electrical circuit with a light source 12, such as a light bulb, for example, or another suitable light source, and to permit the illumination apparatus 2 to provide illumination for work performed on equipment at a work site. In various embodiments, the work site may be located, for example and without limitation, in the proximity of an elevated structure, in or near a confined or partially confined space, or in or near an otherwise difficult-to-access work site. In one aspect, the control circuitry 10 can be activated by use of a push button 14, for example, to complete an electrical circuit among the control circuitry 10, the battery 8, and the light source 12.

Referring again to FIG. 1, in other aspects of the present embodiments, the illumination apparatus 2 can include one or more pedestal assemblies, such as a first pedestal assembly 16 and a second pedestal assembly 18, for example, operatively associating the main housing 6 with the cable 4 as shown. The first pedestal assembly 16 includes a body 16A connected to an attachment/detachment device 16B structured for connection or removal of the pedestal assembly 16 to/from the main housing 6. The first pedestal assembly 16 also includes a set of jaws 16C for grasping the cable 4 to assist with support of the main housing 6 on the cable 4 in the proximity of a work area, for example. The second pedestal assembly 18 includes a body 18A connected to an attachment/detachment device 18B structured for connection or removal of the pedestal assembly 18 to/from the main housing 6. The second pedestal assembly 18 also includes a set of jaws 18C for grasping the cable 4 to assist with support of the main housing 6 on the cable 4 in the proximity of the work area. In various embodiments, the attachment/detachment devices 16B,18B can be provided as suction cup type devices, for example, or other structurally and functionally equivalent devices that are sufficient to connect the pedestal assemblies 16,18 to the main housing 6, but which are also capable of allowing detachment of the pedestal assemblies 16,18 from the main housing 6. In other aspects, while the two pedestal assemblies 16,18 are shown in the example embodiment of FIG. 1, it can be appreciated that any number of pedestal assemblies capable of supporting the main housing 6 and its operatively associated elements on the cable 4 can be applied within the scope of the present apparatus embodiments.

In addition, the illumination apparatus 2 can be provided with a handle 20, as shown in FIG. 1, to permit manual transportation and movement of the illumination apparatus 2, such as may be done by a worker, for example, performing work on equipment at a work site in the proximity of the cable 4. In one embodiment, the pedestal assemblies 16,18 can be detached from the main housing 6, and the illumination apparatus 2 can be manually manipulated by use of the handle 20 without the pedestal assemblies 18,20 for purposes of illumination. In a further embodiment, the illumination apparatus 2 can include a flexible neck 22 connecting the light source 12 to the main housing 6 of the illumination apparatus 2. In one aspect, the flexible neck 22 can be provided as a resiliently flexible material suitable to permit the position of the light source 12 to be adjusted relative to the position of the main housing 6. In one aspect, the flexible but resilient nature of the material or materials of which the flexible neck 22 is manufactured permits the flexible neck 22 to be moved to different locations and shaped into different configurations to direct illumination emanating from the light source 12 to an appropriate place or places in association with the work area. The resilient nature of material or components comprising the flexible neck 22 permit the flexible neck 22 to remain substantially in the same position and substantially in the same configuration to which the flexible neck 22 is moved/formed, such as by manual manipulation of the flexible neck 22, for example.

Figure 2:
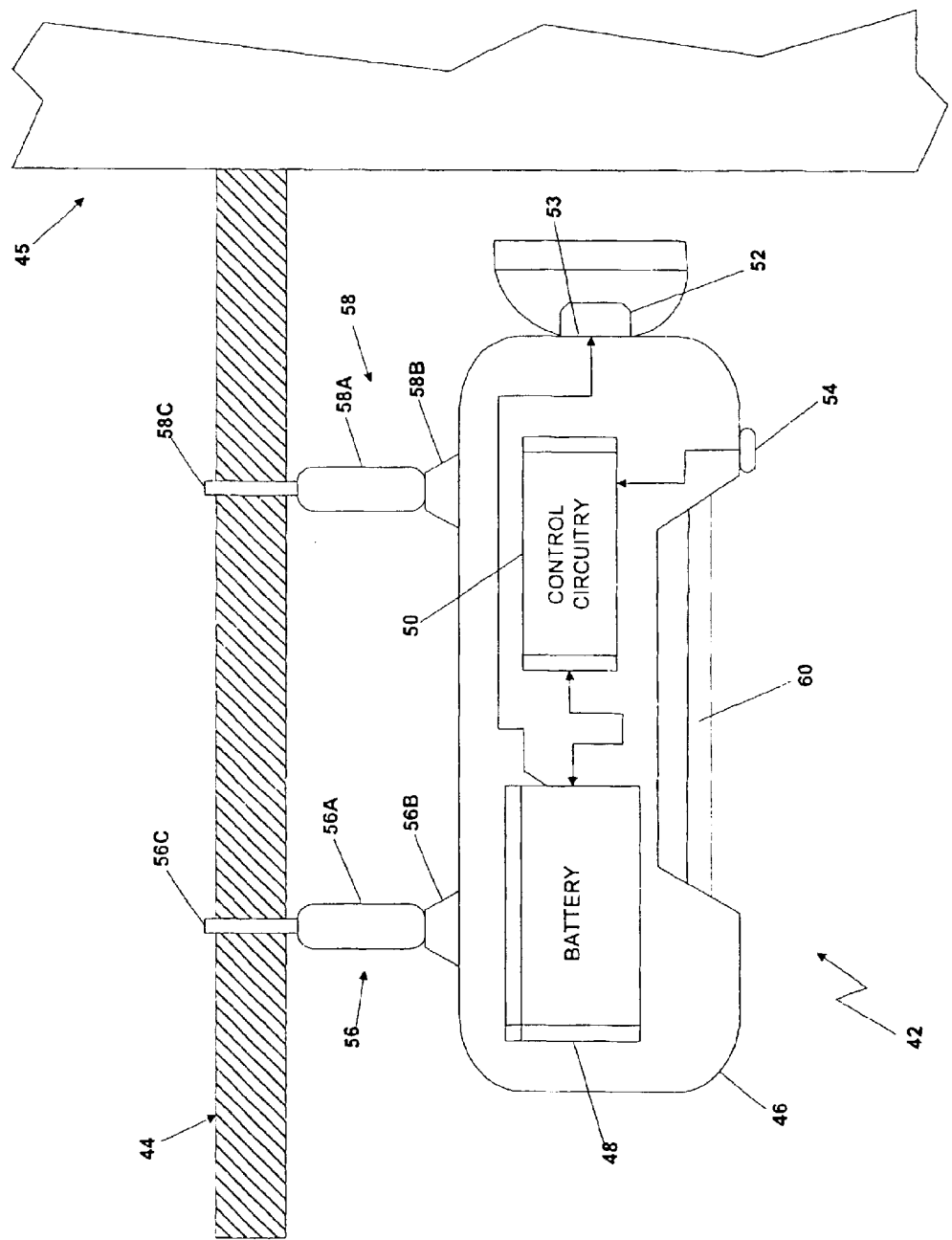
FIG. 2 includes a schematic side view illustration of one example embodiment of an illumination apparatus provided in accordance with the present illumination apparatus embodiments, including schematic diagrams of various internal components of the illumination apparatus.

Referring now to FIG. 2, in one illustrative example embodiment of an illumination apparatus, an illumination apparatus 42 is installed in operative association with a cable 44 connected to a utility structure 45. In this example embodiment, the cable 4 can be connected between the utility structure 45 and one or more other utility structures such as one or more telephone poles, for example. In one aspect, the illumination apparatus 42 includes a main housing 46 having at least one power source such as a battery 48, for example, housed in the main housing 46. The battery 48 is operatively connected to conventional control circuitry 50, which control circuitry 50 is configured to complete an electrical circuit with a light source 62, such as a light bulb, for example, or another suitable light source, and to permit the illumination apparatus 52 to provide illumination for work performed on equipment at a work site. In various embodiments, the work site may be located, for example and without limitation, in the proximity of an elevated structure, in or near a confined or partially confined space, or in or near an otherwise difficult-to-access work site. In one aspect, the control circuitry 50 can be activated by use of a push-button 54, for example, to complete an electrical circuit among the control circuitry 50, the battery 48, and the light source 62.

Referring again to FIG. 2, in other aspects of the present embodiments, the illumination apparatus 42 can include one or more pedestal assemblies, such as a first pedestal assembly 56 and a second pedestal assembly 58, for example, operatively associating the main housing 46 with the cable 44 as shown. The first pedestal assembly 56 includes a body 56A connected to an attachment/detachment device 56B structured for connection or removal of the pedestal assembly 56 to/from the main housing 46. The first pedestal assembly 56 also includes a set of jaws 56C for grasping the cable 44 to assist with support of the main housing 46 on the cable 44 in the proximity of a work area, for example. The second pedestal assembly 58 includes a body 58A connected to an attachment/detachment device 58B structured for connection or removal of the pedestal assembly 58 to/from the main housing 46. The second pedestal assembly 58 also includes a set of jaws 58C for grasping the cable 44 to assist with support of the main housing 46 on the cable 44 in the proximity of the work area. In various embodiments, the attachment/detachment devices 56B,58B can be provided as suction cup type devices, for example, or other structurally and functionally equivalent devices that are sufficient to connect the pedestal assemblies 56,58 to the main housing 46, but which are also capable of allowing detachment of the pedestal assemblies 56,58 from the main housing 46. In other aspects, while the two pedestal assemblies 56,58 are shown in the example embodiment of FIG. 2, it can be appreciated that any number of pedestal assemblies capable of supporting the main housing 46, and its operatively associated elements, on the cable 44 can be applied within the scope of the present apparatus embodiments.

In addition, the illumination apparatus 42 can be provided with a handle 60, as shown in FIG. 2, to permit manual transportation and movement of the illumination apparatus 42, such as may be done by a worker, for example, performing work on equipment at a work site in the proximity of the cable 44. In one embodiment, the pedestal assemblies 56,58 can be detached from the main housing 46, and the illumination apparatus 42 can be manually manipulated by use of the handle 60 for purposes of illumination. In a further embodiment, the light source 52 can be adjustably rotated about a pivot connection 53 with the main housing 56. It can be seen that the pivot connection 53 permits the light source 52 to be directed at a variety of angles with respect to the main housing 46 to direct light emanating from the light source 52 at various areas of a work site, for example.

Figure 3A:
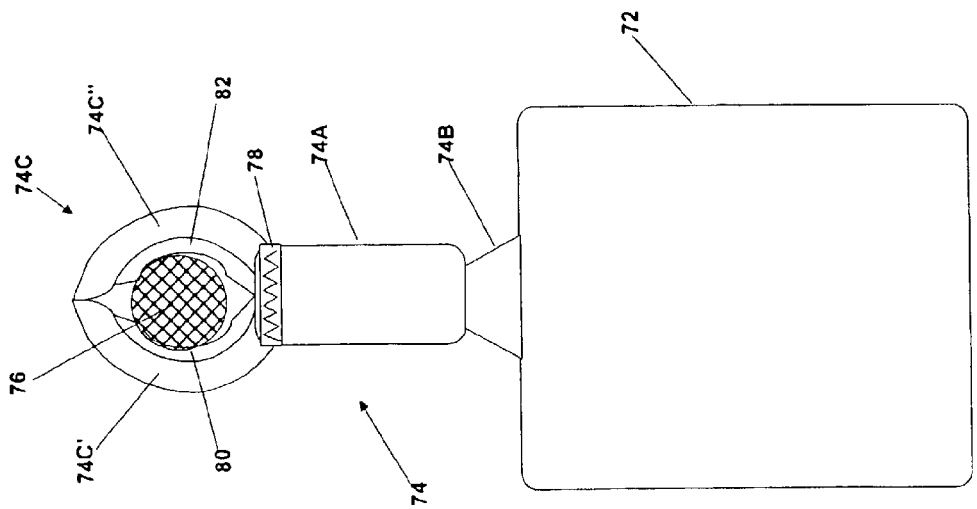
FIGS. 3A and 3B include schematic end view illustrations of example embodiments of illumination apparatuses provided in accordance with the present illumination apparatus embodiments; and, FIG. 4 includes a schematic side view illustration of one example embodiment of an illumination apparatus provided in accordance with the present illumination apparatus embodiments, including schematic diagrams of various internal components of the illumination apparatus.
Figure 3B:
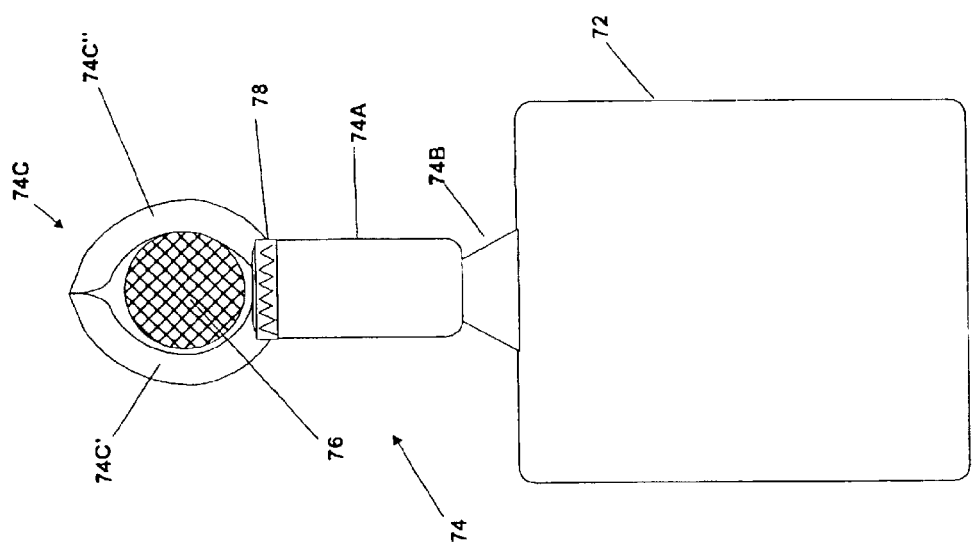

Referring now to FIGS. 3A and 3B, additional example embodiments of the present illumination apparatus embodiments are shown. As shown, a main housing 72 is operatively associated with a pedestal assembly 74 having a body 74A connected to the main housing 72 through use of an attachment/detachment device 74B. A set of jaws 74C is included as part of the pedestal assembly 74 having a first jaw 74C' and a second jaw 74C" pressed together to form the set of jaws 74C. In the example embodiment shown, the jaws 74C',74C" are pressed together, each having a portion in contact with a portion the other, to provide a closed position around a cable 76 (see FIG. 3A). In one aspect, a spring 78 can be installed in the body 74A of the pedestal assembly 74 to resiliently bias the set of jaws 74C to remain in a normally closed position (i.e., wherein portions of the jaws 74C' and 74C" are in substantial contact) during use of the main housing 72 and its associated components as an illumination source. It can be appreciated that the spring 78, in various embodiments provided herein, can be sufficiently sized and positioned to provide an adequate amount of force for maintaining the set of jaws 74C resiliently biased in a normally closed position. In addition, the spring 78, in various embodiments provided herein, can be sufficiently sized and positioned to permit the set of jaws 74C to be forced to an open position, such as to receive the cable 76 between the jaws 74C',74C", for example, which force may be manually applied, for example, to the set of jaws 74C.

In another example embodiment of the present illumination apparatus embodiments, and with reference to FIG. 3B, a first lining 80 can be attached to a portion of the first jaw 74C', and a second lining 82 can be attached to a portion of the second jaw 74C". In one aspect, the material comprising one or both of the linings 80,82 can include, for example and without limitation, a slip-resistant material such as rubber, foam rubber, plastic, sandpaper or other grit-laden material, and/or other materials that assist with resisting movement of the main housing 72 with respect to the cable 76 on which the main housing 72 is supported. It can be appreciated that the linings 80,82 may serve to stabilize an illumination apparatus when used to illuminate a work area at a work site and to resist movement of the illumination apparatus along the cable 76 into a position on the cable 76 that is undesirable for work to be performed. In other aspects, materials comprising the linings 80,82 can be comprised of electrically insulative material, thermally insulative material, water-resistant material, or other material that reflects properties beneficial to operation of an illumination apparatus in a given work environment. It can be appreciated that the linings 80,82 shown in FIG. 3B can be applied to various pedestal assemblies, where applicable, for the various illumination apparatus embodiments disclosed herein.

Figure 4:
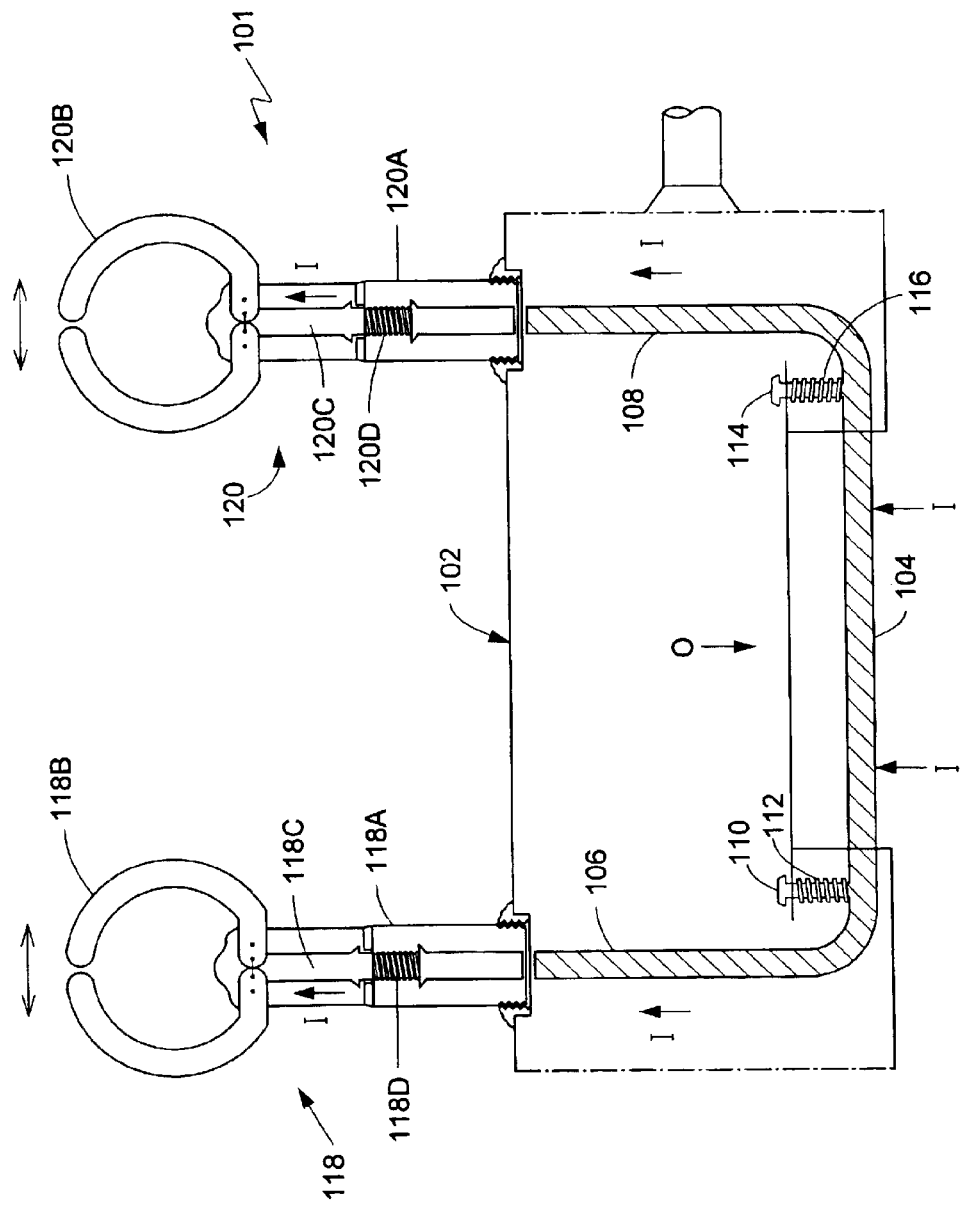

Referring now to FIG. 4, in another example embodiment of the present embodiments, an illumination apparatus 101 is provided. The illumination apparatus 101 includes a main housing 102 is shown including a handle 104 having a first arm 106 and a second arm 108. The handle 104 is operatively associated with the main housing 102 through a first arm stud 110 including a first arm stud spring 112 wrapped around the first arm stud 110, and also through a second arm stud 114 including a second stud arm spring 116 wrapped around the second arm stud 114. In operation, the arm stud springs 112,116 resiliently bias the handle 104 with outward force (as schematically represented by the "O" arrow shown in FIG. 4). It can be appreciated that the size, number and type of studs and/or arm stud springs can be varied in different embodiments herein in accordance with the outward force desired to be generated in reaction to actuation of the handle 104 with respect to the housing 102.

In another aspect, the main housing 102 includes a first pedestal assembly 118 threadedly received into a portion of the main housing 102 and a second pedestal assembly 120 threadedly received into another portion of the main housing 102. It can be seen that, merely for clarity and convenience of illustration, the pedestal assemblies 118, 120 are shown in FIG. 4 rotated approximately ninety degrees from their normally operative positions for supporting the main housing 102. The first pedestal assembly 118 includes a body 118A and a set of jaws 118B pivotally connected to a push rod 118C positioned inside the body 118A of the first pedestal assembly 118. As shown, a push rod spring 118D is positioned on one end of the push rod 118C. The push rod spring 118D is structured for operative contact with a portion of the first arm 106 of the handle 104. In addition, the second pedestal assembly 120 includes a body 120A and a set of jaws 120B pivotally connected to a push rod 120C positioned inside the body 120A of the first pedestal assembly 120. As shown, a push rod spring 120D is positioned on one end of the push rod 118C. The push rod spring 120D is structured for operative contact with a portion of the second arm 108 of the handle 104.

For operative association of the illumination apparatus 101 with a cable (not shown), for example, the handle 104 is manually actuated with inward force (as schematically represented by the "I" arrows in FIG. 4) with respect to the main housing 102. The inward force (I) results in pressure being applied to the combination of the push rod 118C and the push rod spring 118D of the first pedestal assembly 118, as well as pressure being applied to the combination of the push rod 120C and the push rod spring 120D of the second pedestal assembly 120. As shown, applying pressure to the push rod 1118C of the first pedestal assembly 118 results in the set of jaws 118B moving from a resiliently biased normally closed position to an at least partially open position (as indicated by horizontal arrows). Likewise, applying pressure to the push rod 120C of the second pedestal assembly 120 results in the set of jaws 120B moving from a resiliently biased normally closed position to an at least partially open position (as indicated by horizontal arrows). In this manner, with the handle 104 actuated to force the sets of jaws 118B, 120B into an open or partially open position, a cable or other structure can be suitably received into the open position of the sets of jaws 118B, 120B. It can be seen that once inward force on the handle 104 is released, the sets of jaws 118B, 120B return to their resiliently biased normally closed position, and the cable or other structure is held and/or at least partially enclosed by the sets of jaws 118B, 120B. It can be readily appreciated that when inward force is applied manually to the handle 104 by a worker, for example, the illumination apparatus 101 may not require the force of two hands to open the sets of jaws 118B, 120B for providing support of the illumination apparatus 101 on a cable, for example. This benefit permits the worker to perform other tasks with one of his hands while the other hand actuates the handle 104 of the illumination apparatus 101.

In other aspects, while two pedestal assemblies 118,120 are shown in the example embodiment of FIG. 4, it can be appreciated that any number of pedestal assemblies capable of supporting the main housing 102, and its operatively associated elements, on a cable can be applied within the scope of the present apparatus embodiments. In addition, the handle 104 of the illumination apparatus 101 can permit manual transportation and movement of the illumination apparatus 101, such as may be done by a worker, for example, performing work on equipment at a work site in the proximity of the cable. In one embodiment, the pedestal assemblies 118,120 can be threadedly detached from the main housing 102, and the illumination apparatus 101 can be manually manipulated by use of the handle 104 for purposes of illumination.

Materials for construction of the various structural elements (e.g., housings, handles, flexible necks, and other elements) disclosed herein may include, where appropriate and suitable for the reasonably safe and functional practice of the present apparatus embodiments, one or more of the following materials: plastic; rubber; metals such as aluminum, for example; titanium and/or stainless steel; and/or some reasonable combination of such materials. It can be appreciated that choice of materials for construction of the various structural elements disclosed herein is driven, at least in part, by the motivation to provide illumination apparatus embodiments that are relatively lightweight, relatively compact and structurally sound and suitable for illuminating work areas during use under typical work site conditions.

The examples presented herein are intended to illustrate potential implementations of the present method and system embodiments. It can be appreciated that such examples are intended primarily for purposes of illustration. No particular aspect or aspects of the example method and system embodiments described herein are intended to limit the scope of the present invention. The configuration and specific functions of a particular support bracket, for example, are provided merely for convenience of disclosure.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

What is claimed is:

1. An illumination apparatus structured for use in association with a utility structure, said illumination apparatus comprising:
    a main housing having a light source operatively associated with said main housing;
    at least one pedestal assembly detachably connected to said main housing, at least one of said pedestal assemblies having at least one set of jaws structured for receiving a portion of a cable therein;
    a flexible neck structured for operatively associating said light source with said main housing, wherein said flexible neck is comprised of a resiliently flexible material.

2. The illumination apparatus of claim 1, wherein at least one of said pedestal assemblies further includes an attachment/detachment device connected to a body of said pedestal assembly structured for detachably connecting said pedestal assembly to said main housing.

3. The illumination apparatus of claim 1, further comprising a handle attached to a portion of said main housing.

4. The illumination apparatus of claim 1, wherein at least one of said sets of jaws is resiliently biased in a normally closed positioned.

5. The illumination apparatus of claim 4, further comprising at least one spring structured for maintaining said normally closed position of said resiliently biased normally closed set of jaws.

6. The illumination apparatus of claim 1, further comprising a lining positioned on at least a portion of at least one of said sets of jaws.

7. The illumination apparatus of claim 6, wherein said lining is comprised of a material structured to resist movement between said lining and the cable.

8. An illumination apparatus structured for use in association with a utility structure, said illumination apparatus comprising:
    a main housing having a light source operatively associated with said main housing;
    at least one pedestal assembly detachably connected to said main housing, at least one of said pedestal assemblies having at least one set of jaws structured for receiving a portion of a cable therein; and,
    at least one additional pedestal assembly detachably connected to said main housing.

9. An illumination apparatus structured for use in association with a utility structure, said illumination apparatus comprising:
    a main housing;
    a handle having at least one arm operatively associated with said main housing;
    at least one pedestal assembly having at least one set of jaws, said pedestal assembly having a portion connected to said main housing, said set of jaws being structured for receiving a portion of a cable therein; and,
    at least one push rod connected to a portion of at least one of said sets of jaws, said push rod being structured for contact with said arm of said handle.

10. The illumination apparatus of claim 9, further comprising at least one arm stud attached to said handle for operatively associating said handle with said main housing.

11. The illumination apparatus of claim 10, further comprising at least one arm stud spring wrapped around said arm stud, said arm stud spring being structured for biasing said handle outwardly with respect to said main housing.

12. The illumination apparatus of claim 9, wherein at least one of said pedestal assemblies includes a detachable connection to said main housing.

13. The illumination apparatus of claim 12, wherein said detachable connection includes a threadedly detachable connection.

14. The illumination apparatus of claim 9, further comprising at least one push rod spring operatively associated with at least one of said push rods.

15. The illumination apparatus of claim 14, further comprising said push rod spring being positioned on an end of said push rod structured for operative contact with said arm of said main housing.

16. The illumination apparatus of claim 9, further comprising at least one additional pedestal assembly detachably connected to said main housing.

* * * * *